United States Patent [19]

Young

[11] Patent Number: 5,717,547
[45] Date of Patent: Feb. 10, 1998

[54] MULTI-TRACE TRANSMISSION LINES FOR R/W HEAD INTERCONNECT IN HARD DISK DRIVE

[75] Inventor: James A. Young, Holden, Mass.

[73] Assignee: Quantum Corporation, Milpitas, Calif.

[21] Appl. No.: 726,450

[22] Filed: Oct. 3, 1996

[51] Int. Cl.⁶ ........................................... G11B 5/48
[52] U.S. Cl. ........................................... 360/104; 360/108
[58] Field of Search ................................ 360/104

[56] References Cited

U.S. PATENT DOCUMENTS

| | | | |
|---|---|---|---|
| 5,384,432 | 1/1995 | Noro et al. | 360/104 X |
| 5,491,597 | 2/1996 | Bennin et al. | 360/104 |
| 5,519,552 | 5/1996 | Kohira et al. | 360/104 |
| 5,597,496 | 1/1997 | Masaichi et al. | 360/104 |

*Primary Examiner*—John H. Wolff
*Attorney, Agent, or Firm*—David B. Harrison

[57] ABSTRACT

An integrated transmission line array of multiple interleaved trace conductors symmetrically formed in a single plane for electrically interconnecting a read element or a write element of a dual element read/write head to a preamplifier circuit in a disk drive.

18 Claims, 7 Drawing Sheets

MULTI-TRACE TRANSMISSION LINES FOR R/W HEAD INTERCONNECT IN HARD DISK DRIVE

REFERENCE TO RELATED APPLICATIONS

This related to copending U.S. patent application Ser. No. 08/720,836, entitled. "Suspension with Integrated Conductors having Trimmed Impedance", and filed on Oct. 3, 1996 which is a continuation-in-part of U.S. patent application Ser. No. 8/621,431, filed on Mar. 25, 1996, the disclosure thereof being incorporated herein by reference. This is also related to copending U.S. patent application Ser. No. 08/720,833, entitled: "Suspension with Multi-Layered Integrated Conductor Trace Array for Optimized Electrical Parameters", and filed on Oct. 3, 1996, the disclosure thereof being incorporated herein by reference; and to copending U.S. patent application Ser. No. 08/724,978, entitled: "Head Suspension with Self-Shielding Integrated Conductor Trace Array", and filed on Oct. 3, 1996, the disclosure thereof being incorporated herein by reference.

FIELD OF THE INVENTION

This invention relates generally to planar interleaved trace interconnect structures for connecting read/write heads to preamplifier/driver circuits wherein the trace interconnect structures provide reduced inductance and characteristic impedance in order to more precisely match a magnetoresistive thin-film head to a preamplifier.

BACKGROUND OF THE INVENTION

Contemporary disk drives typically include a rotating rigid storage disk and a head positioner for positioning a data transducer at different radial locations relative to the axis of rotation of the disk, thereby defining numerous concentric data storage tracks on each recording surface of the disk. The head positioner is typically referred to as an actuator. Although numerous actuator structures are known in the an, in-line rotary voice coil actuators are now most frequently employed due to their simplicity, high performance, and their ability to be mass balanced about their axis of rotation, the latter being important for making the actuator less sensitive to perturbations. A closed-loop servo system within the disk drive is conventionally employed to operate the voice coil actuator and thereby position the heads with respect to the disk surface.

The read/write transducer, which may be of a single or dual element design, is typically deposited upon a ceramic slider structure having an air beating surface for supporting the transducer at a small distance away from the surface of the moving medium. The combination of an air bearing slider and a read/write transducer is also known as a read/write head or a recording head. Single write/read element designs typically require two wire connections while dual designs having separate reader and writer elements require four wire connections. Dual element magnetoresistive (MR) heads in particular generally require four wires. MR read elements are typically formed as a thin film resistor whose resistance changes slightly in the presence of a magnetic field. When e.g. a constant current is passed through an MR read element, magnetic flux transitions result in modulating the resistance, and the transitions are then detected and amplified as voltage changes by a preamplifier. Since the MR read element is a low ohmic value resistor (e.g. 20 to 40 Ohms), it is inherently a signal plus noise source, and it is important that this source be properly matched and connected to the preamplifier input. A low impedance, low resistance transmission line is needed to match the MR read element's low impedance and to deliver the signal modulation to the preamplifier without loss, injection of noise, peaking or ringing.

As taught by U.S. Pat. No. 5,491,597 to Bennin et al., entitled: "Gimbal Flexure and Electrical Interconnect Assembly", the disclosed prior approach called for use of a spring material for the conductive trace layers, such as beryllium-copper alloy, which admittedly has higher electrical resistance than pure annealed copper, for example. On the other hand, pure annealed copper, while a satisfactory electrical conductor at high frequencies, also manifests high ductility rather than spring-like mechanical resilience, and therefore lacks certain mechanical spring properties desired in the interconnect trace material. Traces formed of pure copper plated or deposited onto e.g. a nickel base layer provide one lower resistance alternative to the beryllium-copper alloy relied upon by the Bennin et al. approach.

These hybrid flexure designs employ relatively lengthy parallel runs of conductor trace pairs or four-wire sets which extend from bonding pads at the distal, head-mounting end of the flexure to the proximal end of the flexure, to provide a signal path or service loop from the read/write head along the length of the associated suspension structure to the preamplifier or read-channel chip(s) some distance away.

Previously, twisted pair and the simple two-trace polyimide flex circuit transmission lines of the type proposed by the Bennin et al. patent exhibited relatively high characteristic impedance, (typically on the order of 80 to 150 Ohms), and twisted-pair conductors varied widely from unit to unit, depending upon twisting pitch and other variables. The high inductance of the prior twisted-pair and two-trace flex circuit designs, when combined with the input capacitance of the preamplifier circuit, caused significant peaking near the band edge for the read channel (e.g. 80 to 260 MHz). When excited by data signals, the transmission network responded by ringing, causing asymmetries in the data pulses and the generation of false data. The poorly matched MR head and preamplifier networks also manifested a higher sensitivity to noise. Thus, a hitherto unsolved need has been for a trace conductor array having a lower inductance and lower characteristic impedance for more nearly matching the low impedance of the MR read element (about 30 Ohms), such that the system becomes series-terminated and broad-band with no undesirable peaking or insufficient damping.

SUMMARY OF THE INVENTION WITH OBJECTS

A general object of the present invention is to provide an integrated transmission line array of multiple interleaved trace conductors symmetrically arranged in a single plane for electrically interconnecting a read element of a dual element read/write head to a preamplifier circuit in a disk drive in a manner overcoming limitations and drawbacks of prior approaches.

Accordingly, a reduced inductance trace interconnect array for electrically interconnecting a read/write transducer head to read/write circuitry, comprises a dielectric support substrate, a plurality of commonly connected first electrical traces disposed on the dielectric support substrate and comprising a first signal conductor, at least one second electrical trace disposed on the dielectric support substrate in symmetrical planar interleaved relation with adjacent ones of the plurality of first electrical traces and comprising a second signal conductor, so that the first and second signal conductors may connect at least one of read and write elements of the transducer head to the read/write circuitry.

In this aspect of the invention the second electrical trace preferably has a cross-sectional area approximately equal to the sum of cross-sectional traces of the plurality of commonly connected first electrical traces.

As a related aspect of the invention, a plurality of second electrical traces are provided on the dielectric support substrate in the same number of traces as the plurality of first electrical traces. The second traces are symmetrically spaced apart from, and interleaved with, the first traces, and all traces lie within a single trace plane. As a further related aspect, pairs of the plurality of first electrical traces are interconnected at one end of the array by bridge traces disposed on the dielectric support structure, and at an opposite end of the array by electrical bridging paths extending across an interleaved one of the plurality of second electrical traces; and, pairs of the plurality of second electrical traces are interconnected at said opposite end by bridge traces disposed on the dielectric support structure, and at said one end by electrical bridging paths extending across an interleaved one of the plurality of first electrical traces.

An integrated flexure/conductor structure having reduced inductance for supporting a multi-element read/write head/slider assembly adjacent to a storage medium and for electrically interconnecting a read element of the head to read circuitry, the flexure/conductor structure comprises a generally planar conductive flexure member having a gimbal for supporting the read/write head/slider structure in proximity to a relatively moving data storage disk; a first electrical insulation layer disposed on the flexure member; a plurality of commonly connected first electrical traces disposed on the first electrical insulation layer and comprising a first signal conductor, and at least one second electrical trace disposed on the first electrical insulation layer in symmetrical planar interleaved relation with adjacent ones of the plurality of first electrical traces and comprising a second signal conductor.

As a further aspect of the present invention, a disk drive for storing and reproducing information includes a disk drive base; a storage disk rotatably mounted to the base and rotated by a disk spindle motor; a slider for flying in close proximity to a storage surface of the disk; a dual-element magnetoresistive read/inductive write head for reading information from and writing information to the storage disk; a movable actuator mounted to the base for selectively positioning the head relative to a radius of the storage disk; a read preamplifier/write driver circuit mounted on the actuator for communicating with the head; and, an integrated-conductor suspension attached to the actuator for supporting the head adjacent to the storage disk and for electrically interconnecting the head to the read preamplifier/write driver circuit. In this disk drive the suspension includes a generally planar conductive load beam structure having a proximal actuator mounting end and a gimbaled head mounting region at a distal end for attaching the head, an electrical insulation layer attached to the load beam structure along a trace interconnect region and having a plurality of commonly connected first electrical traces comprising a first signal conductor, and at least one second electrical trace in symmetrical planar interleaved relation with adjacent ones of the plurality of first electrical traces and comprising a second signal conductor.

These and other Objects, advantages, aspects, and features of the present invention will be more fully appreciated and understood upon consideration of the following detailed description of preferred embodiments presented in conjunction with the accompanying drawings.

DETAILED DESCRIPTION OF PREFERRED EMBODIMENTS

Figure 1:
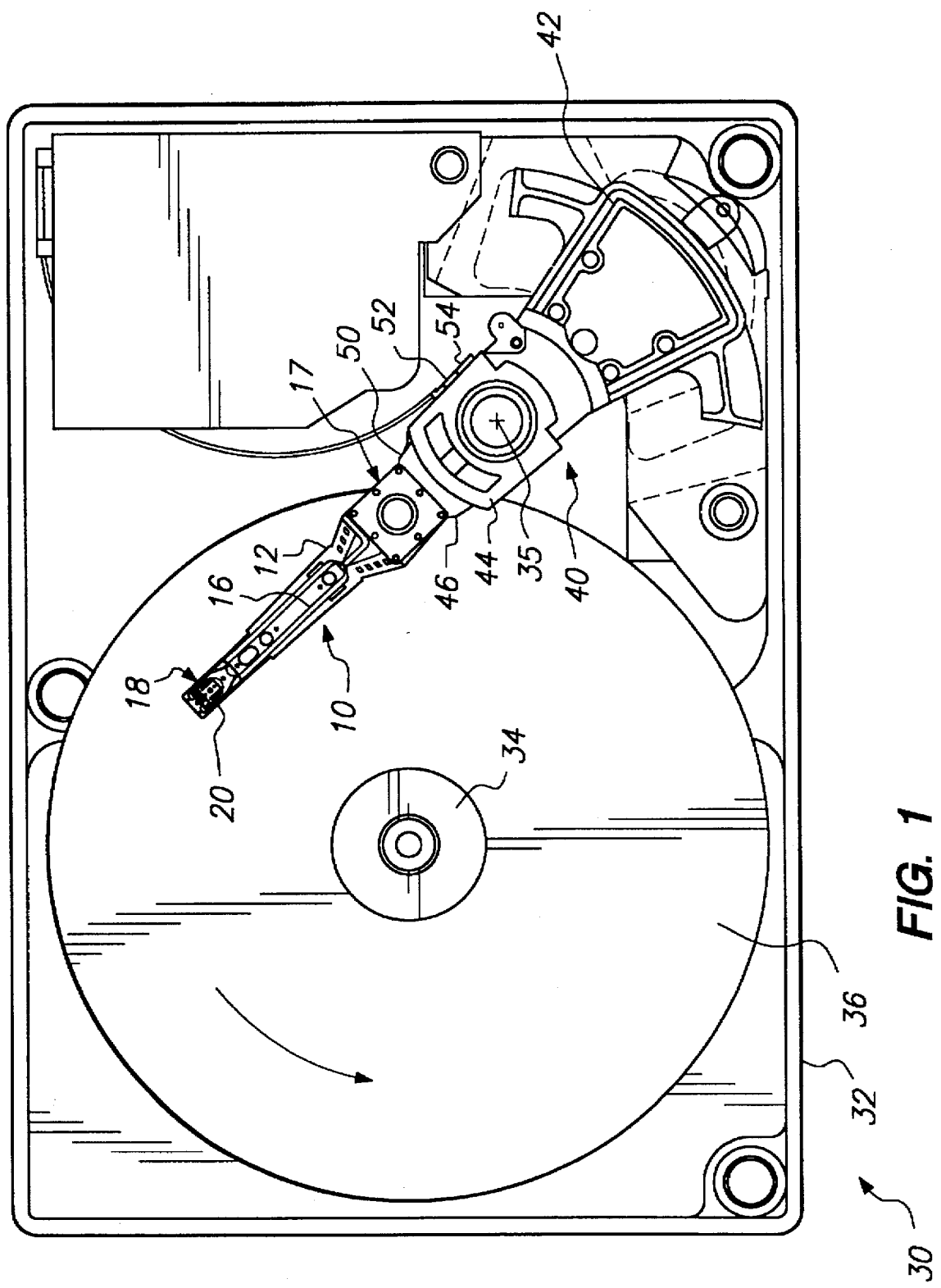
FIG. 1 is an enlarged, diagrammatic plan view of a hard disk drive including a suspension assembly having a conductive trace array transmission line.
Figure 2:
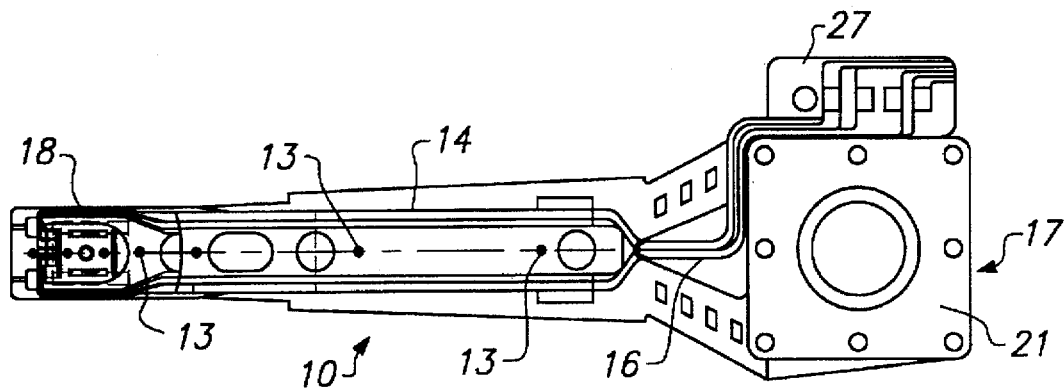
FIG. 2 is an enlarged diagrammatic plan view of an integrated flexure/conductor load beam structure having conventional conductive traces.

Referring to the drawings, where like characters designate like or corresponding parts throughout the views, FIG. 1 presents a diagrammatic top plan view of an exemplary head/disk assembly (HDA) of a hard disk drive 30. The hard disk drive 30 employs at least one load beam assembly 10 having e.g. a flexure 14 including a multi-trace interleaved transmission line 16 embodying principles of the present invention. FIG. 1 shows the load beam assembly 10 with the flexure 14 and trace interconnect array 16 employed within an intended operating environment.

In the present example disk drive 30 includes e.g. a rigid base 32 supporting a spindle 34 (and spindle motor, not shown) for rotating at least one storage disk 36 in a direction shown by the curved arrow at a predetermined angular velocity. Drive 30 also includes a rotary actuator assembly 40 rotationally mounted to the base 32 at a pivot point 35. The actuator assembly 40 includes a voice coil 42 which, when selectively energized by control circuitry (not shown), moves and thereby positions an actuator E-block-44 and head arms 46 (and load beam assemblies 10) at radial track positions defined on the facing surfaces of storage disks 36. At least one of the load beam assemblies 10 is secured at its proximal end 17 to a distal end of a head arm 46, e.g. by conventional ball-swaging techniques.

Conventionally, but not necessarily, two load beam assemblies 10 are attached to head arms 46 between disks 36: and, one load beam structure 10 is attached to head arms above and below the uppermost and lowermost disks of a disk stack comprised of multiple disks 36 spaced apart on spindle 34. The interleaved multi-trace transmission line 16A, 16B, in accordance with principles of the present invention connects to a hybrid circuit substrate 52 secured to a side of the E-block 44. The hybrid circuit substrate 52 secures and connects e.g. a semiconductor chip 54 providing read preamplifier and write driver functions. Most preferably, the chip 54 is nested between the substrate of the hybrid circuit 52 and the E-block sidewall, and is secured to the sidewall by a suitable conductive adhesive or thermal transfer compound such that heat generated during operation of the chip 54 is dissipated into the E-block by conduction, and outwardly into the ambient air volume by convection. The substrate 52 may be a ceramic material, or an equivalent material having the requisite electrical insulation/thermal conductivity properties.

Figure 3A:
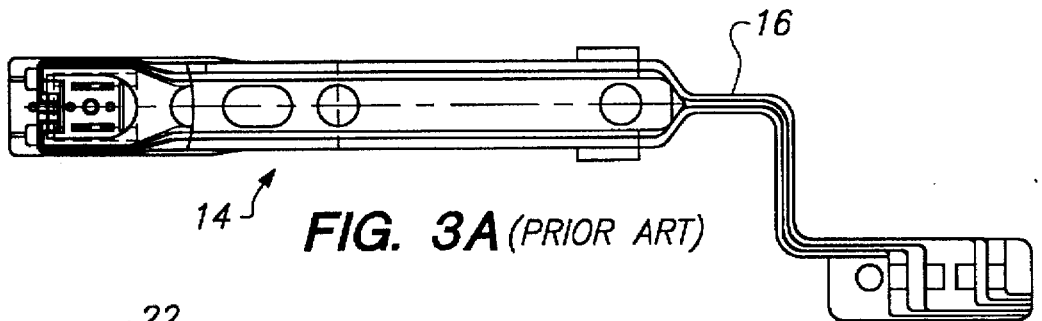
FIG. 3A is an enlarged plan view of a flexure of the FIG. 2 load beam structure having integral wiring incorporating the conventional conductive trace array.
Figure 3B:
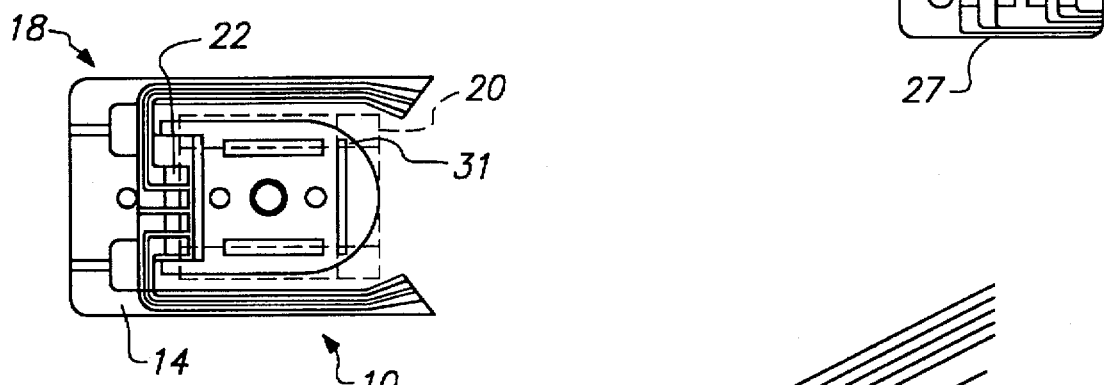
FIG. 3B is a greatly enlarged plan view of a conventional read/write head connection region of the FIG. 3A flexure trace array and wherein the head slider is shown in dashed line outline.
Figure 3C:
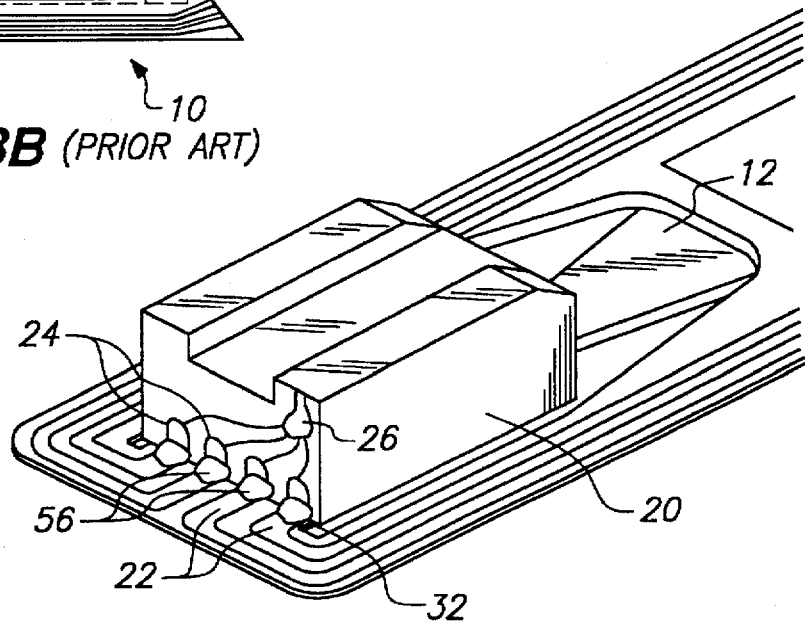
FIG. 3C is a greatly enlarged view in perspective of a slider end of the FIG. 2 load beam structure showing the slider attached to the flexure gimbal, and showing conventional electrical gold ball connections between the flexure trace array and the read/write head connection pads of the slider.

As shown in FIGS. 2, 3A, 3B and 3C the load beam assembly 10 includes a generally planar formed stainless steel load beam 12 and a flexure 14. In the present example, the flexure 14 is formed of thin stainless steel sheet material which is e.g. approximately 20-microns thick. An array of two pairs of conductive traces 60 and 62 of approximately 10 microns thick copper conductor forms part of an interconnect structure 16 which extends from the proximal end 17 of flexure 14 to another connection pad array 22 located at the slider-supporting distal end 18 of the load beam assembly 10. A transducer head slider 20 is attached to the gimbal 14 by a suitable adhesive at the distal end 18 of the load beam structure 10. As shown in FIG. 3B the four connection pads 22 at the distal end 18 are provided for connection by e.g. ultrasonically-welded gold ball bonds 56 to four aligned connection pads 24 of a dual-element (four conductor) thin film magneto-resistive read/write structure 26 formed on a trailing edge of the slider body 20. Preferably, although not necessarily, the slider body 20 is a 30% slider.

The need for a low characteristic impedance (approximately 30 Ohms) in a read path trace interconnect structure arises from the need to match the resistance of the MR read element so as to "series-terminate" the transmission line from the head 26 to an input network of the preamplifier chip 54. Although some multilayer structures having transmission lines which are vertically arranged (as in the 50, 75 and 100 ohm strip-line of microwave technology) can produce a low characteristic impedance ($Z_o$), single layer planar multi-trace arrays with or without foil layers can produce low $Z_o$ without requiring high permitivity dielectric.

Figure 4A:
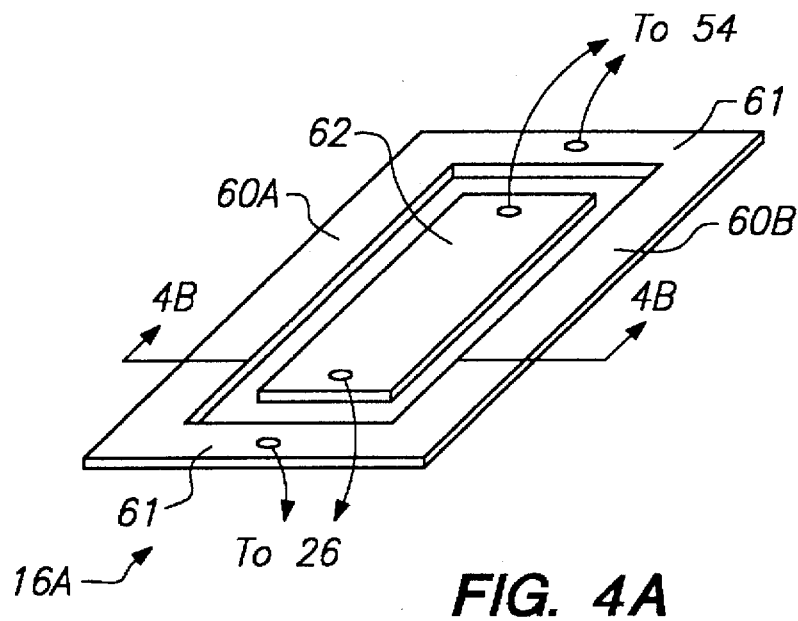
FIG. 4A is a greatly enlarged, isometric view of an interleaved three-trace planar transmission line in accordance with principles of the present invention.
Figure 4B:
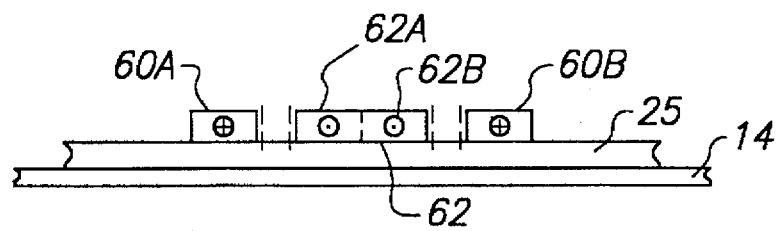
FIG. 4B is a sectional view in elevation of the FIG. 4A transmission line, taken along the section line 4B—4B.

Accordingly, a single-plane interleaved multi-trace interconnect structure 16A includes e.g. at least three conductive traces 60A, 62 and 60B forming a single signal transmission line carried on a high dielectric polyimide film base 25. As shown in FIGS. 4A and 4B, outer traces 60A and 60B are connected in parallel at each end by trace bridge portions 61 and comprise e.g. a forward path signal conductor, while single trace 62, interleaved between traces 60A and 60B, comprises e.g. a return path signal conductor of the array 16A. Conductors 60 and 62 electrically connect the MR read element 26 to the preamplifier 54: Most preferably as shown in FIG. 4B, with constant thickness traces, the width of single trace 62 is twice the width of each surrounding trace 60A, 60B, so that the cross-sectional area and perimeter of trace 62 is substantially equal to the sum of cross-sectional areas and perimeters of traces 60A and 60B, thereby electrically balancing the array 16A. As will be shown hereinafter, this three-trace transmission line array 16A reduces characteristic line impedance $Z_o$ to about one-third less than the impedance of a simple two-trace interconnect array of the type illustrated in the Bennin et al. patent referenced above. By adding a ground plane as by the flexure 14 into proximity of the traces 60A, 62 and 60B, mutual coupling between the traces is increased, and the resultant characteristic impedance $Z_o$ of the transmission line 16A is reduced further.

Figure 5:
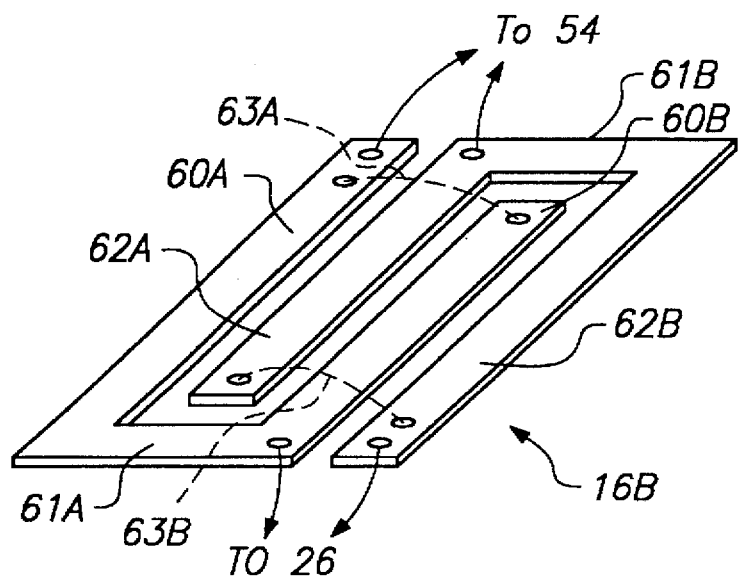
FIG. 5 is an isometric view of an interleaved four-trace planar transmission line in accordance with principles of the present invention.

FIG. 5 illustrates a four-trace interleaved transmission line trace array 16B formed in a single plane on a single e.g. polyimide dielectric film layer. The four interleaved traces 60A-60B and 62A-62B are shown as being of the same width, with traces 60A-60B connected by a trace bridge 61A at the MR element 26 end, and by a second bridging path 63A at the preamplifier 54 end, and with traces 62A-62B connected by a trace bridge 61B at the preamplifier 54 end and by a second bridging path 63B at the MR sensor 26 end. The sec paths 63A and 63B may be transverse traces formed on a separate dielectric layer and connected to terminal ends of the trace array 16B by vias (not shown), or wires or other bridge interconnect paths and devices may be employed. The new $Z_o$ is less than one half of the $Z_o$ of the original pair; and, a proximate ground plane reduces $Z_o$ further.

Figure 6:
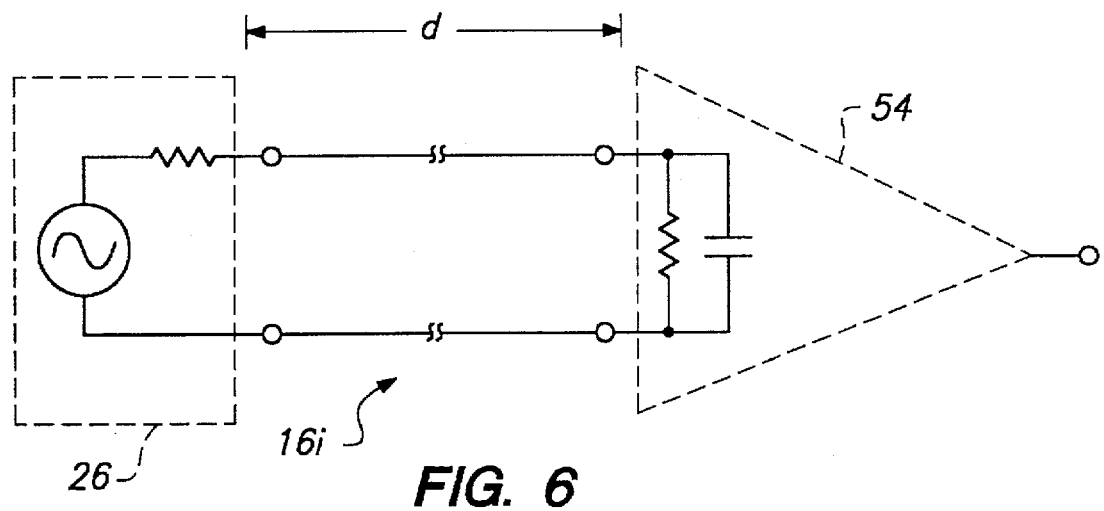
FIG. 6 is an electrical schematic diagram of an idealized, lossless interconnection path of length d between a MR sensor and a preamplifier input network.

As shown schematically in FIG. 6, an ideal transmission line 16i would deliver the very high frequency AC signal sensed by the MR element 26 from the data patterns recorded on disk 36 to an input network of the preamplifier 54 without introducing any unwanted signal losses or conditioning. With a small shunt capacitance of the input network of the preamplifier 54 on the order of 10 picoFarads, the MR sensor 26 and the preamplifier input network form a benign low pass filter having a rolloff above a signal pass band of interest, e.g. 80 260 MHz.

In fact, as a function of the distance d, a conventional two-trace array transmission line 16 tends to add a potentially significant series resistance (which adds noise to the path signal-to-noise ratio) and an undesirable amount of inductance in series with the MR sensor 26 and the input network of preamplifier 54. The relatively high series inductance arising from the two parallel traces combines with shunt capacitance Cs and the preamplifier input capacitance Ci to form a series resonant circuit which has a fairly sharp peak in the region of the lower edge of the desired pass band.

The present invention, illustrated by FIGS. 4A, 4B and 5, provides an interleave trace transmission line 16A, 16B which reduces inductance and characteristic impedance and provides a better match of the MR element 26 to the preamplifier 54, thereby removing the peak at the edge of the desired pass band, and increasing the damping of the interconnect network which reduces its tendency to ring and produce false data.

Figure 7:
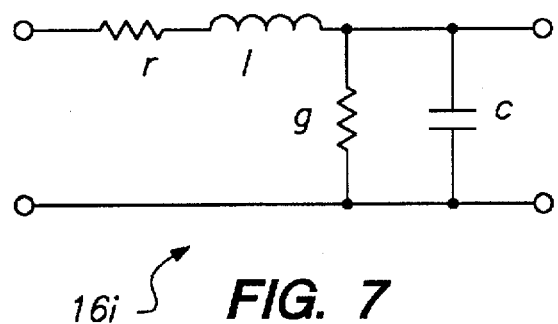
FIG. 7 is a per-unit-length, or incremental, lumped constant element model of a real transmission line of the type used to connect the MR sensor and preamplifier input of FIG. 6.

From transmission line theory the characteristic impedance (Zo) of the FIG. 7 network is given by the relationship:

$Zo=\sqrt{(z/y)}$, where $z=r+j\omega l$, $y=g+j\omega c$, and an incremental section of the line is illustrated by FIG. 7. (The terms r, l, g, and c are the per-unit-length valises, and $\omega=2\pi f$ radians per second. Ignoring the series resistance and shunt conductance which tend to be relatively small compared to the $\omega l$ and $\omega c$ terms, the characteristic transmission line impedance is $Zo=\sqrt{(l/c)}$. Another useful relationship is the velocity of propagation, $v=1/\sqrt{(l\cdot c)}$, for lossless lines which can be obtained by time domain reflection measurements. In this case $v=x/t$, where $t=T/2$ or ½ the "down and back" time of reflections on the transmission line whose magnitudes are used to obtain Ro. This analysis leads to relationships which provide the incremental l and c, namely:

$l=Ro/v$ and $c=1/(Ro\cdot v)$

From LC ladder networks certain impedance bridge measurements can be made at appropriate frequencies to estimate the incremental l and c above. For a transmission line (comprising a cascade of the FIG. 7 lumped element incremental sections, at frequencies below that at which the line is ¼ wavelength but above those at which the series resistance (r) and parallel conductance (g) parameters would interfere with the lossless approximation, the Lsc (short-circuit inductance) is dominated by the distributed line inductance, and the Coc (open circuit capacitance) is dominated by the distributed line capacitance.

Figure 8:
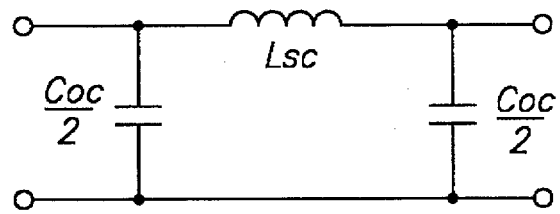
FIG. 8 is a Pi equivalent circuit model of a full-length implementation the FIG. 7 transmission line model.

A Pi network equivalent circuit for a full-length implementation of the FIG. 7 transmission line model is given in FIG. 8. A corresponding characteristic impedance Zo for the transmission line 16$i$ is given by:

$Zo=\sqrt{(Lsc/Coc)}$

For a transmission line 16$i$ having a length x, $l=Lsc/x$ and $c=Coc/x$

Propagation velocity $(V)=1/\sqrt{lc}=x/\sqrt{(Lsc\cdot Coc)}=Vo/\sqrt{\mu_r E_r}$ where Vo=velocity of light (300 million meters per second), $\mu_r=1$, and the dielectric constant Er is approximately 3 for the polyimide dielectric layer 25. Note also that as a delay line the $Td=\sqrt{(Lsc\cdot Coc)}$ and can be used with the characteristic impedance Zo for simulations (e.g. using PSPICE) to obtain comparisons with actual LC networks.

Figure 9:
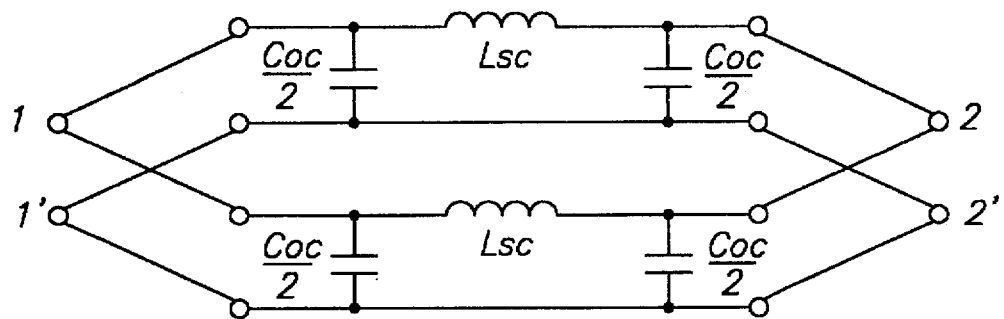
FIG. 9 is an extension of the FIG. 8 Pi equivalent circuit model to two transmission lines connected in parallel, but coupling between lines is ignored in this model.

Properly used, simple Pi networks may be used to predict multi-trace transmission networks. However, at first glance, paralleling two trace array transmission lines as shown in FIG. 9 would yield a multi-trace characteristic impedance Zo as one half the characteristic impedance of the single transmission line case. This analysis omits the additional interaction of mutual inductance which is desirably present in an interleaved multi-trace array 16A, 16B of the present invention (FIGS. 4A, 4B and 5).

Figure 10:
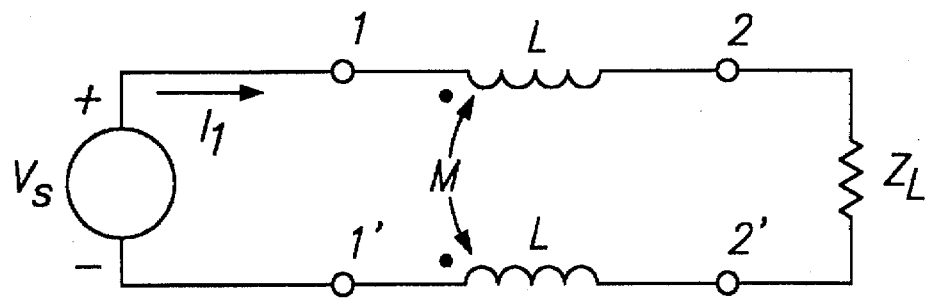
FIG. 10 is a mutual coupling model of a simple, two trace transmission line.

A mutual coupling model (FIG. 10) of a simple two-trace transmission line may be analogized to a single-turn 1:1 transformer used in a different way. In the FIG. 10 model, the mutually coupled, short circuit inductance Lsc=2 (L-M) =L(Pi net). To lower the coupled inductance Lsc, the mutual inductance M must approach the trace self-inductance L. In practical terms, this means that to lower the coupled inductance Lsc, the traces are moved closer together.

Figure 11:
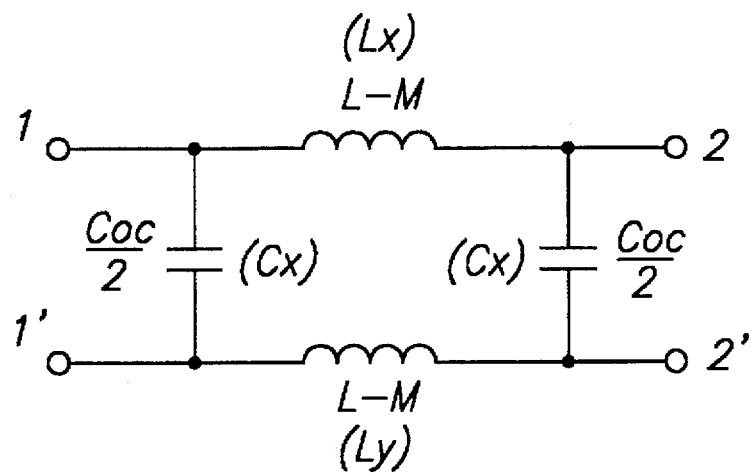
FIG. 11 is an equal transformerless model of the FIG. 10 transmission line with implied mutual coupling and with capacitive coupling added between the traces.

FIG. 11 presents another model with capacitive coupling between conductors added. In this model, L is equal to the self-inductance of the trace and M is the mutual inductance kL between adjacent traces, where 0<k<1, (i.e., the coefficient of coupling). The FIG. 11 model is therefore useful as a transformerless building block for multiwire transmission line network analysis, providing the two-wire transmission lines within the multiwire network can be identified.

Figure 12:
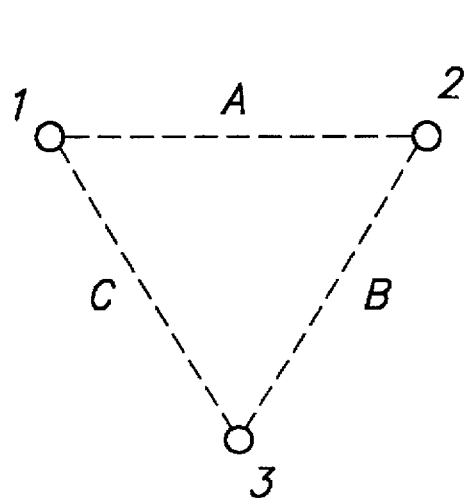
FIG. 12 is a highly diagrammatic end view of an equilateral three-trace mutual coupling model.
Figure 13:
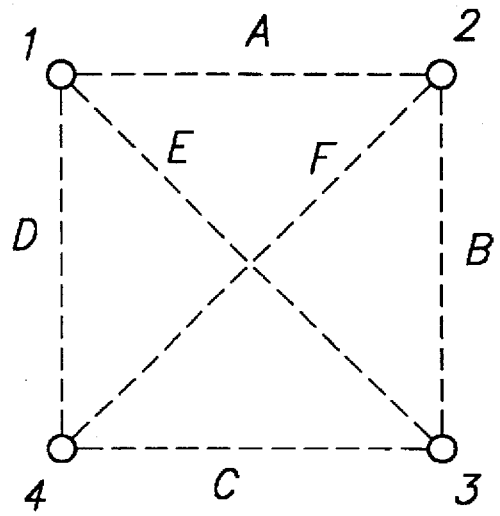
FIG. 13 is a highly diagrammatic end view of an equilateral four-trace mutual coupling model.

As shown in the FIG. 12 diagrammatic three-wire end view, a three-wire symmetrical (equilateral triangle) network model has a system of three unique two-wire transmission lines: TA=1,2; TB=2,3 and TC=3,1. The FIG. 13 end view shows that a symmetrical (square) four-wire network model has a system of six unique two-wire transmission lines: TA=1,2; TB=2,3; TC=3,4; TD=4,1; TE=1,3; and, TF=2,4.

Figure 14:
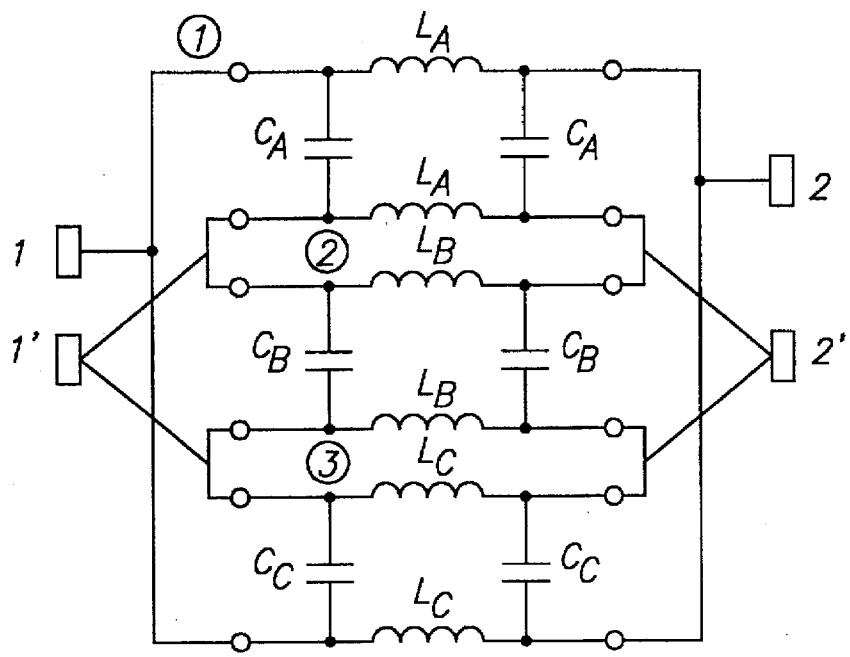
FIG. 14 is a three-trace transmission line equivalent network model.

Applying the analysis of the FIG. 12 three-wire model, a three-trace transmission line equivalent network model may be developed, beginning with FIG. 14. The FIG. 14 model may be simplified to the model of FIG. 15 which shows three inductive paths: a first path of parallel inductance LA and LC, a second path of parallel inductance LA and LB, and a third path of parallel inductance LB and LC.

Figure 15:
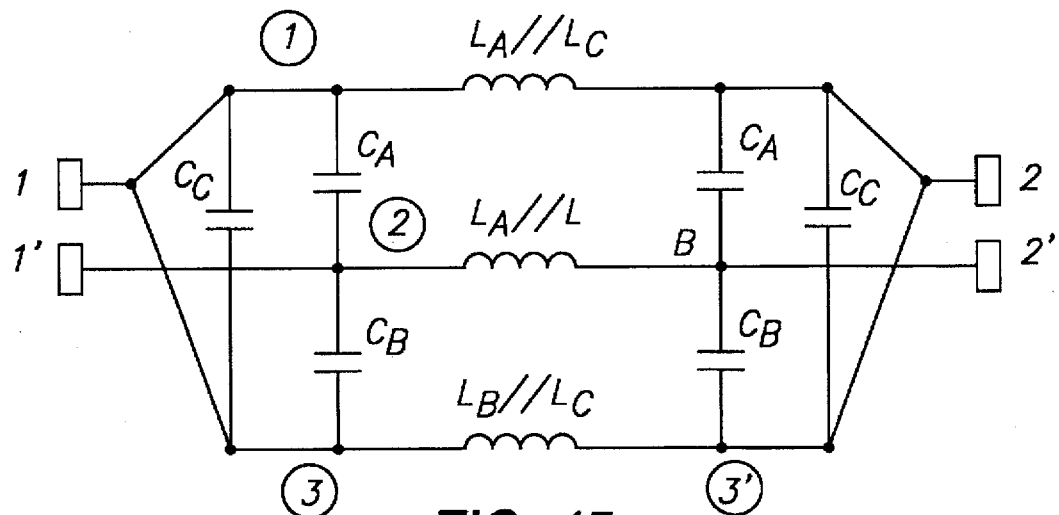
FIG. 15 is a refinement of the FIG. 14 equivalent network model.
Figure 16:
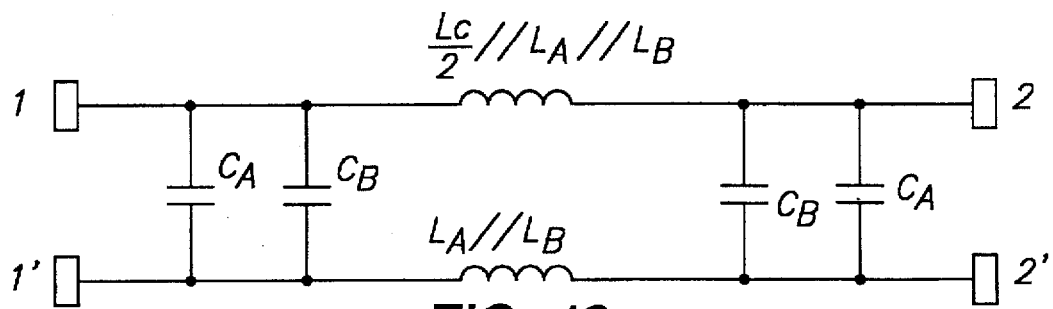
FIG. 16 is a further refinement of the FIG. 14 three-trace transmission line equivalent network model.

FIG. 15 may be reduced to a general two-terminal network as FIG. 16 which is similar to FIG. 11, except for the x and y postscript notations wherein Lx may not equal Ly, generally. If LA=LB=LC, as in the equliateral FIG. 12 case, then Lx=LA/2, Ly=LA/4, and Cx=2CA A new short circuit inductance Lsc(D) is given by Lsc(D)=Lx+Ly=3LA/4; and a new open circuit capacitance Coc(D) is given by Coc(D) =2Cy=4CA. A new characteristic impedance Zo(D) then is given by $Zo(D)=\sqrt{(Lsc(D)/Coc(D))}=\sqrt{/(3LA/4\cdot\frac{1}{4}CA)}= \sqrt{3/16}\cdot\sqrt{(LA/CA)}$. But, since the basic sub-model transmission line impedance $ZA=\sqrt{(LA/CA)}$, the new Zo(D) is $\sqrt{(3/16)}\cdot ZA$.

The sub-model inductances LA, LB and LC are not measurable directly because they are in parallel with another inductor. However, it is practical to measure any two traces with the others absent, e.g. traces 1 and 2 by eliminating all components connected to nodes 3 and 3' in FIG. 15 and with LA=LB=LC in the symmetrical three-trace model, Lsc= LA=2(L-M) and Coc=2CA (FIG. 16). Accordingly, the characteristic impedance of the two-trace sub-model Z1,2= $\sqrt{(LA/2CA)}=ZA/\sqrt{2}$. So, then the new characteristic impedance Zo(D) becomes $Zo(D)=(3/16)\cdot ZA=\sqrt{(3/16)}\cdot\sqrt{2}\cdot Z1,2$, or New $Zo(D)=\sqrt{(3/8)}\cdot Z1,2=0.612 Z1,2$ Experimental measurements of two trace models have shown a correlation to within 11% of this theoretical value.

Figure 17:
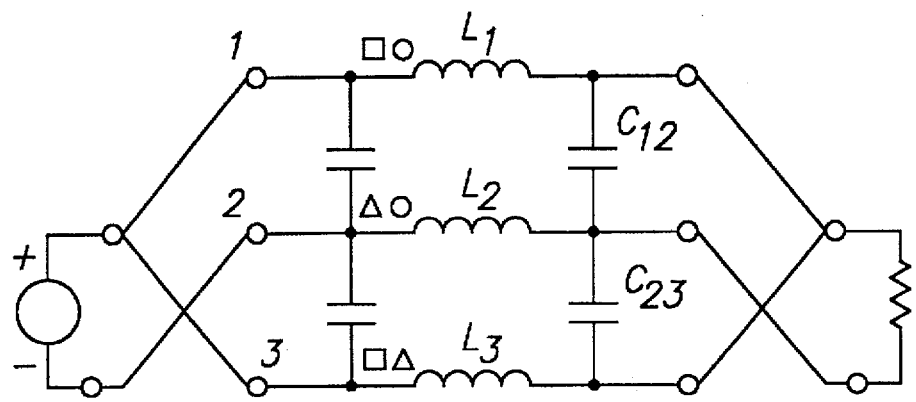
FIG. 17 is a three-trace mutually coupled equivalent network model.

Turning now to FIG. 17, a three-trace mutually coupled model is presented. If L1=L3 and M1,2=M2,3 (where L equals trace self-inductance and M equals mutual inductance between adjacent traces), short circuit inductance Lsc becomes $Lsc=L1/2+L2+M1,3/2-2 \cdot M1,2$. If this model is further simplified to the case where $L1=L2=L3$, $M1,2=M2,3=M3,1$; and, $C1,2=C2,3$, which is the three dimensional, equilateral triangle case presented in FIG. 12, then a two-trace sub model result would be:

$$Lsc(D)=3/2(L1-M1,2)$$

However, the short circuit inductance Lsc of an actual two-trace transmission line (not the sub-model) is given by $Lsc(2\text{-wire})=Lsc(2)=2 \cdot (L1-M1,2)$. Then, $$Lsc(D)=3/4 Lsc(2)=3/4 LA$$

and $$Coc(D)=4C1,2=4CA=2Coc(2)$$

The resultant characteristic impedance according to this mutual coupling model then is $$Zo(D)=\sqrt{(Lsc(D)/Coc(D))}=\sqrt{((3/4) \cdot Lsc(2) \cdot (1/2 Coc(2))} = \sqrt{(3/8)} \cdot Zo(2)$$

This result checks with the uncoupled network model for this case: $0.612 Zo(2\text{-wire})$.

In the symmetrical three-trace planar case 16 where the traces are interleaved, let $L1=L2=L3$, $M2,1=M2,3$ and $M1,3$ is $1/2 M1,2$ (because the 1,3 spacing, is two times the spacing of 1,2), then the short circuit inductance $Lsc(3\text{-wire})$ becomes $$Lsc(3w)=(L1)/2+L1+(M1,2)/4-2M1,2$$

Rearranging the terms and substituting $Lsc(2)=2(L1-M1,2)$, $$Lsc(3w)=Lsc(2)-(2 \cdot L1-M1,2)/4$$

But, $M1,2=2 \cdot M1,3$, then $$Lsc(3)=Lsc(2)-(2 \cdot L1-2M1,3)/4$$

But, $Lsc1,3(2)=2.L1-2.M1,3$ (i.e. the 1,3 trace transmission line), then $$Lsc(3w)=Lsc1,2(2)-(Lsc1,3(2))/4$$

Figure 18:
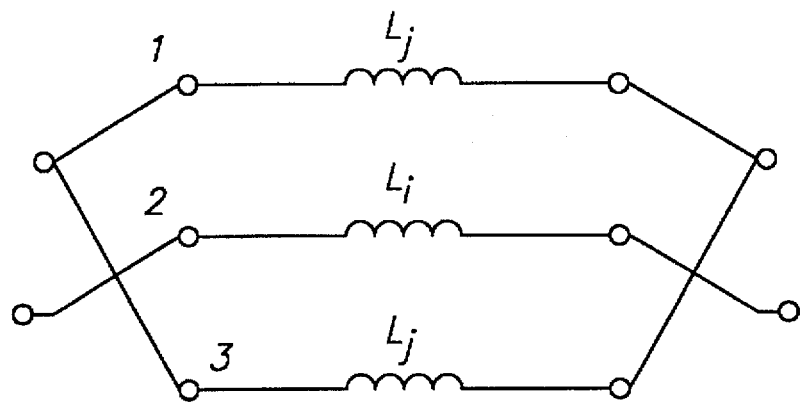
FIG. 18 is a three-trace inductively uncoupled equivalent network model.

Reconciling this result with a general case where M1,3 is not known but the serf-inductance of each trace is the same (Ls) and the network is symmetric about a center trace, i.e. $M1,2=M2,3$, the FIG. 18 three-trace model is reached. (FIG. 18 is like the FIG. 15 model without capacitors). In the FIG. 18 model, the unique transmission lines (1,2, 1,3,) are tested, as follows:

$$Lsc1,2(2) = 2(Ls - M1,2) = Lj + Li = Lsc2,3(2)$$

$$Lsc1,3(2) = 2(Ls - M1,3) = 2Lj$$

$$Li = Lsc1,2 - Lj = Lsc1,2 - Lsc1,3/2$$

$Lsc(3)=Lsc1,2(2)-1/4 Lsc1,3(2)$, which confirms the assumption made above that M1,3 is equal to (M1,2)/2. This analysis also demonstrates a simple way to measure a two-trace ribbon transmission line and use the results to model a multi-trace array.

Figure 19:
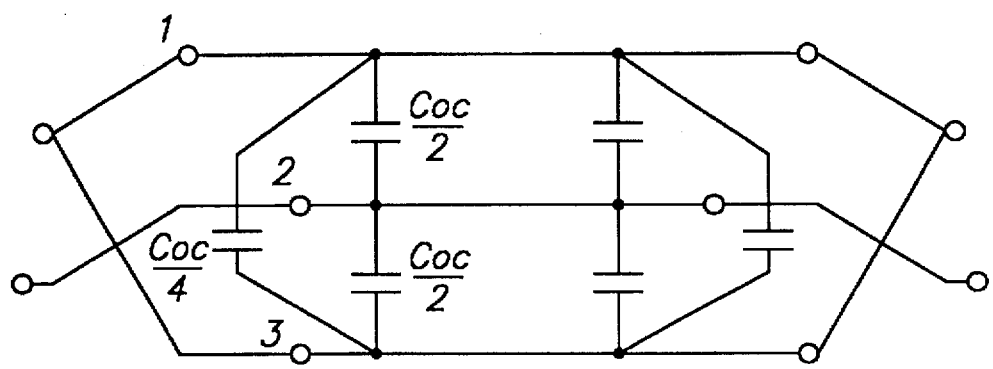
FIG. 19 is a three trace capactively coupled equivalent network model.

Analysis of the open circuit capacitance of the three-trace planar model follows a similar argument, namely that $Coc1,3=(Coc1,2)/2$ because of spacing. This analysis leads to FIG. 19. By inspection of the FIG. 19 three trace model, $Coc(3)=2 \cdot Coc1,2$, since terminal 1 is shorted to terminal 3 in the FIG. 19 model. Parallel interleaved trace networks 16 of the type shown in FIGS. 4 and 5 result in larger capacitance. One way to reduce short circuit inductance without suffering a large increase in open circuit capacitance is to reduce the effective dielectric constant. The best dielectric is a vacuum where the dielectric constant Er equals unity. The Bennin et al. patent referred to above shows an embodiment which suspends the two-trace assembly above the load beam structure on spacers, in order to use ambient air as a coupling dielectric between the traces and the grounded flexure.

The trace array structure 16A, 16B is conventionally formed by any suitable patterning technique, whether by way of photolithography and selective etch, or by selective deposition, lamination or attachment of the conductive traces to the dielectric layers with adhesives, etc. A protective overcoat of dielectric film material may be provided over the exposed surface of the arrays 16A, 16B, to prevent any corrosion or oxidation of the traces, and/or to provide desired mechanical properties to the structure.

Although the present invention has been described in terms of the presently preferred embodiment, i.e., a deposited conductor flexure structure which implements a gimbal, it should be clear to those skilled in the art that the present invention may also be utilized in conjunction with, for example, an integrated gimbal load beam structure, or other conductive suspension members having proximately mounted, deposited, or embedded conductors with or without insulating overcoatings. Thus, it should be understood that the instant disclosure is not to be interpreted as limiting. Various alterations and modifications will no doubt become apparent to those skilled in the art after having read the above disclosure. Accordingly, it is intended that the appended claims be interpreted as coveting all alterations and modifications as fall within the true spirit and scope of the invention.

What is claimed is:

1. A reduced inductance trace interconnect array for electrically interconnecting a read/write transducer head to read/write circuitry of a disk drive, comprising:
   a high dielectric film base secured to structure between the read/write transducer head and the read/write circuitry,
   a plurality of commonly connected first electrical traces disposed on the high dielectric film base and interconnected at terminal ends thereof to comprise a first signal conductor,
   at least one second electrical trace disposed on the high dielectric film base in an elongated planar interleaved relation with adjacent ones of the plurality of first electrical traces and comprising a second signal conductor,
   the first and second signal conductors forming a single signal transmission line for connecting one of read and write elements of the transducer head to the read/write circuitry.

2. The reduced inductance trace interconnect array set forth in claim 1 wherein the second electrical trace has a cross-sectional area approximately equal to the sum of cross-sectional traces of the plurality of commonly connected first electrical traces.

3. The reduced inductance trace interconnect array set forth in claim 1 further comprising a plurality of second electrical traces formed on the high dielectric film base and in the same number of traces as the plurality of first electrical traces and symmetrically spaced apart and interleaved therewith within a single plane.

4. The reduced inductance trace interconnect array set forth in claim 3 wherein pairs of the plurality of first electrical traces are interconnected at one terminal end of the array by bridge traces disposed on the dielectric support structure, and at an opposite terminal end of the array by electrical bridging means extending across an interleaved one of the plurality of second electrical traces; and, wherein pairs of the plurality of second electrical traces are interconnected at said opposite terminal end by bridge traces disposed on the dielectric support structure, and at said one terminal end by electrical bridging means extending across an interleaved one of the plurality of first electrical traces.

5. The reduced inductance trace interconnect array set forth in claim 4 wherein the plurality of first traces comprises two traces, and the plurality of second traces comprises two traces interleaved with the two first traces.

6. The reduced inductance trace interconnect array set forth in claim 1 wherein the high dielectric film base comprises a polyimide film.

7. The disk drive set forth in claim 1 wherein the electrical insulation layer comprises a polyimide film.

8. An integrated flexure/conductor structure having reduced inductance for supporting a multi-element read/write head/slider assembly adjacent to a rotating data storage disk of a disk drive and for electrically interconnecting a read element of the head to read circuitry of the disk drive, the flexure/conductor structure comprising:

a generally planar conductive flexure member having a gimbal for supporting the read/write head/slider structure in proximity to a relatively moving data storage disk;

a high dielectric film base disposed on the flexure member;

a plurality of first electrical traces disposed on the high dielectric film base and connected together at terminal ends to comprise a first signal conductor, at least one second electrical trace disposed on the high dielectric film base in an elongated planar interleaved relation with adjacent ones of the plurality of first electrical traces and comprising a second signal conductor, the first and second signal conductors forming a single transmission line for electrically interconnecting the read element to the read circuitry.

9. The integrated flexure/conductor structure set forth in claim 8 wherein the second electrical trace has a cross-sectional area approximately equal to the sum of cross-sectional traces of the plurality of commonly connected first electrical traces.

10. The integrated flexure/conductor structure set forth in claim 8 further comprising a plurality of second electrical traces formed on the high dielectric film base in the same number of traces as the plurality of first electrical traces and symmetrically spaced apart and interleaved therewith within a single plane.

11. The integrated flexure/conductor structure set forth in claim 10 wherein pairs of the plurality of first electrical traces are interconnected at one terminal end of the array by bridge traces disposed on the first insulation layer, and at an opposite terminal end of the array by electrical bridging means extending across an interleaved one of the plurality of second electrical traces; and, wherein pairs of the plurality of second electrical traces are interconnected at said opposite terminal end by bridge traces disposed on the first insulation layer, and at said one terminal end by electrical bridging means extending across an interleaved one of the plurality of first electrical traces.

12. The integrated flexure/conductor structure set forth in claim 11 wherein the plurality of first traces comprises two traces, and the plurality of second traces comprises two traces interleaved with the two first traces.

13. The integrated flexure/conductor structure set forth in claim 7 wherein the high dielectric film base comprises a polyimide film.

14. A disk drive for storing and reproducing information, the disk drive comprising:

a disk drive base;

a storage disk rotatably mounted to the base and rotated by disk motor means;

a slider for flying in close proximity to the storage disk, a dual-element magnetoresistive read/inductive write head for reading information from and writing information to the storage disk;

a movable actuator mounted to the base for selectively positioning the head relative to a radius of the storage disk;

a read preamplifier/write driver circuit mounted on the actuator for communicating with head; and an integrated-conductor suspension attached to the actuator for supporting the head adjacent to the storage disk and for electrically interconnecting the head to the signal processing means, the suspension comprising:

a generally planar conductive load beam structure having a proximal actuator mounting end and a gimbaled head mounting region at a distal end for attaching the head, a high dielectric film base having a portion attached to the load beam structure along a trace interconnect region, and a plurality of first electrical traces disposed on the high dielectric film base and having terminal ends interconnected to form a first signal conductor, and at least one second electrical trace disposed on the first electrical insulation layer in an elongated planar interleaved relation with adjacent ones of the plurality of first electrical traces and comprising a second signal conductor, the first and second signal conductors forming a single transmission line for electrically interconnecting one element of the dual-element magnetoresistive read/inductive write head to the read preamplifier/write driver circuit.

15. The disk drive set forth in claim 14 wherein the second electrical trace has a cross-sectional area approximately equal to the sum of cross-sectional traces of the plurality of commonly connected first electrical traces.

16. The disk drive set forth in claim 14 wherein pairs of the plurality of first electrical traces are interconnected at one terminal end of the array by bridge traces disposed on the first insulation layer, and at an opposite terminal end of the array by electrical bridging means extending across an interleaved one of the plurality of second electrical traces; and, wherein pairs of the plurality of second electrical traces are interconnected at said opposite terminal end by bridge traces disposed on the first insulation layer, and at said one terminal end by electrical bridging means extending across an interleaved one of the plurality of first electrical traces.

17. The disk drive set forth in claim 16 wherein the plurality of first traces comprises two traces, and the plurality of second traces comprises two traces interleaved with the two first traces.

18. The disk drive set forth in claim 14 further comprising a plurality of second electrical traces formed on the high dielectric film base and in the same number of traces as the plurality of first electrical traces and symmetrically spaced apart and interleaved therewith within a single plane.

* * * * *